Oct. 9, 1956   H. BRETTHAUER   2,765,763
FILM TYPE AND SPEED INDICATOR FOR PHOTOGRAPHIC CAMERAS
Filed Oct. 20, 1953   2 Sheets-Sheet 1

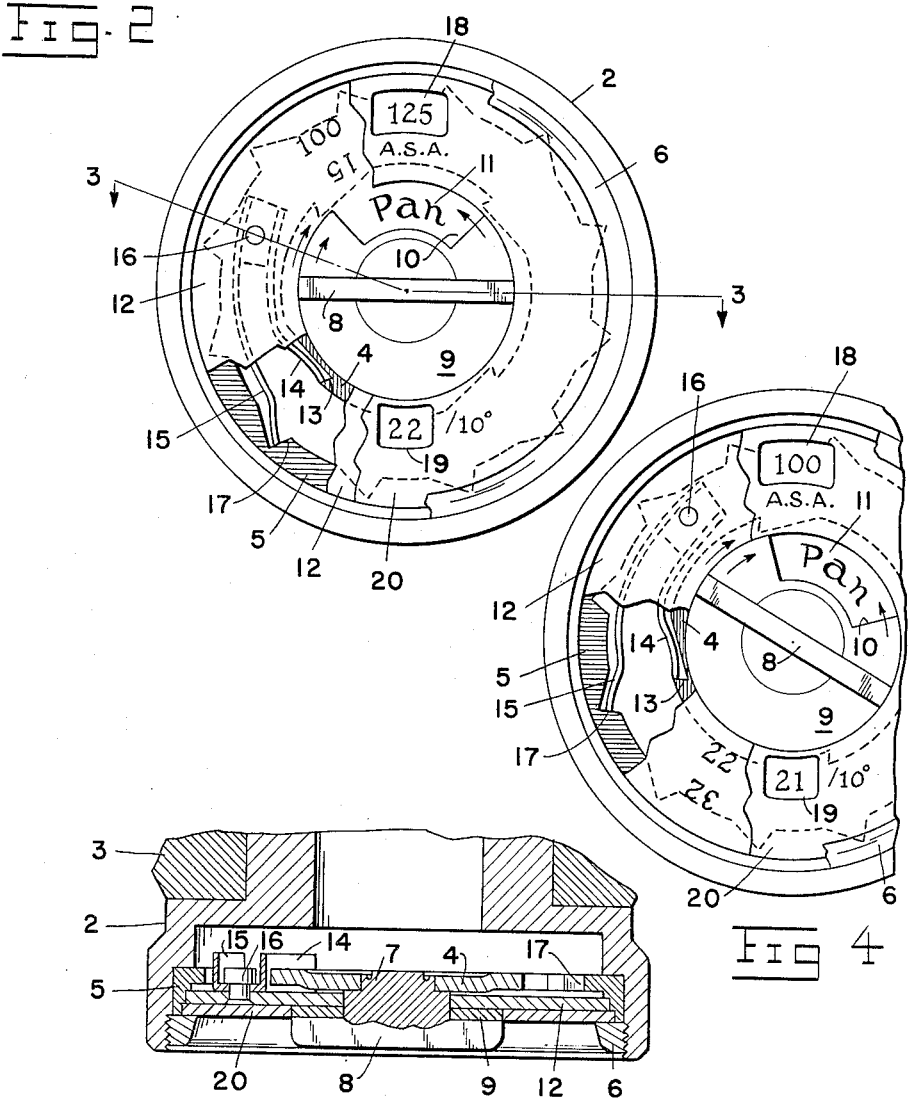

United States Patent Office 2,765,763
Patented Oct. 9, 1956

2,765,763

FILM TYPE AND SPEED INDICATOR FOR PHOTOGRAPHIC CAMERAS

Hermann Bretthauer, Braunschweig, Germany, assignor to Franke & Heidecke, Fabrik Photographischer Präzisions-Apparate, Braunschweig, Germany, a German firm Application October 20, 1953, Serial No. 387,120

Claims priority, application Germany October 23, 1952

8 Claims. (Cl. 116—114)

A photographer loads his camera at different times with different types or kinds of film, and frequently it is difficult for him to remember, at any given moment, just what type or kind of film is in the camera. It is therefore highly desirable that there be mounted on the camera or closely associated with the camera, some kind of indicator settable by the photographer to indicate to him what type of film (such as panchromatic, orthochromatic, color film for daylight use, or color film for artificial light, etc.) is loaded in the camera, and also to indicate the speed rating of the particular film used, since certain types of film are available in more than one speed rating.

An object of the present invention is the provision of a generally improved and more satisfactory indicator of this kind, for mounting on or attachment to a photographic camera.

Another object is the provision of an indicator so designed and constructed that it may be built into and enclosed within the focusing knob of the camera, and which may be constructed in such compact form as to avoid any undesired enlargement of the size of the focusing knob.

A further object is the provision of an indicating device so designed and constructed that the respective indications of film type and film speed may both be changed readily by a simple turning movement of a single operating member, turning the same in one direction to change the indication of film type, and turning the same in the opposite direction to change the indication of film speed.

These and other desirable objects may be attained in the manner disclosed as an illustrative embodiment of the invention in the following description and in the accompanying drawings forming a part hereof, in which:

Fig. 2 is an elevational view of the focusing knob with parts broken away in order to better show the construction of the indicator;

Fig. 3 is a diametrical section taken substantially on the line 3—3 of Fig. 2;

Fig. 4 is a view similar to a fragment of Fig. 3, showing the parts turned to a different position to indicate a film of different speed.

The same reference numerals throughout the several views indicate the same parts.

Figure 1:
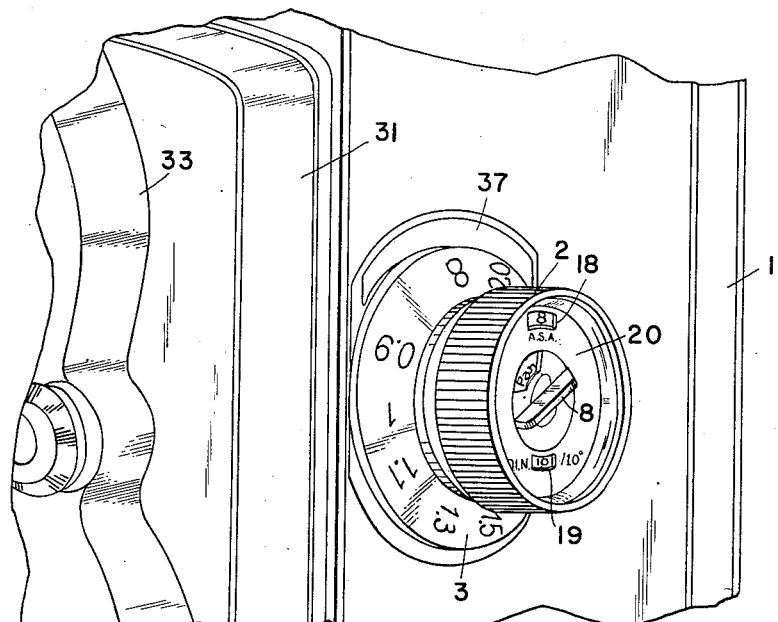
Fig. 1 is a perspective view of a photographic camera having a focusing knob equipped with the present invention.
Figure 5:
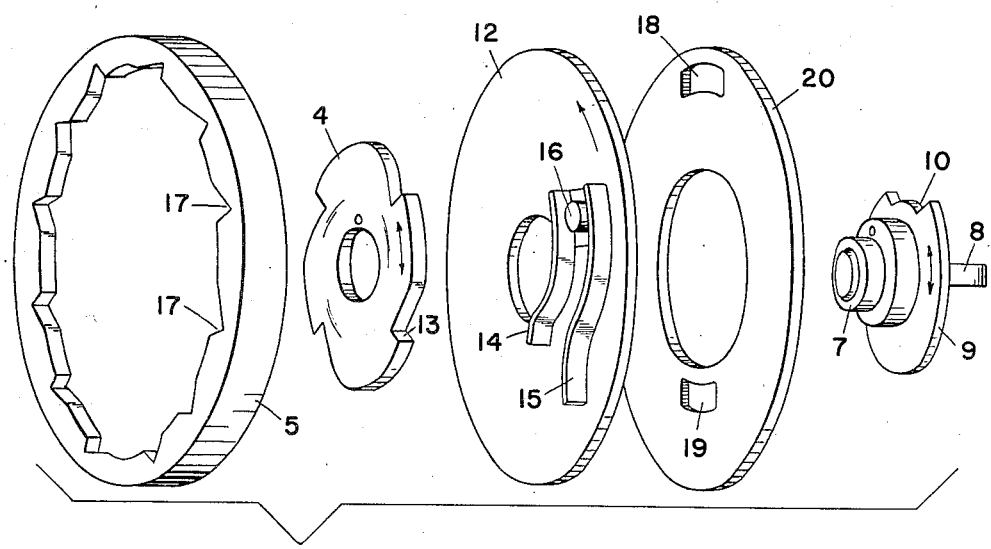
Fig. 5 is an exploded view of the principal parts of the indicator of the present invention.

Referring now to Fig. 1 of the drawings, there is shown a camera having a main body 1, having a movable front 31, which is movable forwardly and backwardly for focusing purposes, by turning the focusing knob 2 which is located on the left side wall of the camera. The focusing front 31 has a forwardly projecting casing portion 33 which carries, near its bottom, the picture taking lens and shutter, and which also carries in its upper part the focusing lens, these parts being known. Such a construction is shown, for example, in Scholkemeier U. S. Patent 2,642,790, granted June 23, 1953, in which patent the camera body is designated by the numeral 1, the focusing knob is shown at 7, the movable focusing front of the camera is indicated at 6, the shutter casing and the mount for the picture taking lens is designated by the numeral 2, and the focusing lens mount is designated at 3. Returning now to Fig. 1 of the drawings of the present application, the focusing knob 2 has a conical flange or rim 3 bearing suitable indications of distances, which are read in conjunction with suitable indicia (not shown) on the scale plate 37 which is mounted on the adjacent side wall of the camera body.

Referring now to Figs. 2 and 3, the knob 2 is hollow. Rotatable within it, on the same axis of rotation on which the knob 2 itself turns is the toothed disk 4 fixed (preferably by riveting, as shown) to the shank 7 of a handle or grip portion 8, which shank 7 extends rotatably through a disk-like plate 12. Forwardly of the plate 12, the shank 7 has a handle portion or grip portion (which may be in the form of a diametrical ridge accessible at the outer end of the focusing knob 2) and a disk 9, of considerably smaller diameter than the disk 12, lies on the front face of the disk 12 and behind the grip portion 8 and is fixed to the grip portion so as to turn with the portion 8, shank 7, and toothed disk 4 which all turn together as a unit.

The disk 12 thus supports and forms a bearing for the rotary parts 4, 7, 8, and 9. The disk 12 itself is rotatable in an annular rim or mounting flange or ring 5 which is fixed in the focusing knob 2, and is held therein by a retaining ring 6 screwed into the end of the focusing knob, which retaining ring 6 serves also to hold in stationary position an annular disk 20 which lies in front of the rotary disk 12 and which extends radially inwardly from the mounting flange 5 to the periphery of the disk 9.

The disk 9 is provided with a sight window 10 (Fig. 2) through which may be read various indications 11 of film type such as "pan," "ortho," "color N," or "color A," or other suitable indications or symbols of film type, imprinted on the front face of the disk 12 in suitable position to be selectively read through the window 10 when the parts 8, 9 are turned relative to the disk 12. Also, the disk 20 is provided with two separate sight windows or openings 18 and 19, at different radial distances from the center, through which various indications of film speed may be read, these indications being imprinted on the front face of the disk 12. For instance, a circumferential series of indications arranged to appear selectively through the sight opening 18 may refer to the usual exposure index numbers or film speed numbers according to one system, such as the American Standards Association system, while a second circumferential series of numbers closer to the center and arranged to appear selectively through the window 19 may refer to the film speed or exposure index according to a different system, such as the European Continental system known as "D. I. N." By turning the parts 4, 7, 8, and 9 clockwise relative to the permanently stationary disk 20 and the then stationary disk 12, different film type indications may be made to appear through the sight window 10, while by turning the parts 4, 7, 8, and 9 clockwise to cause corresponding clockwise turning of the disk 12 relative to the stationary disk 20, different indications of film speed or exposure index may be made to appear through the sight openings 18 and 19.

To enable the desired turning of the parts, the disk 4 is provided on its periphery with teeth 13 which are correlated with the film type indications, and the inner periphery of the annular ring 5 is provided with teeth 17 which are correlated with the film speed or exposure index indications. A double armed leaf spring having arms 14 and 15 for cooperating respectively with the teeth 13 and 17, is riveted to the rear face of the disk 12 at 16.

From the foregoing, it will be seen that if the grip portion 8 is grasped and turned in a clockwise direction (viewed as in Figs. 1 and 2) the engagement of the spring 14 with one of the teeth 13 will cause the clockwise turning motion to be transmitted through the spring 14 to the disk 12, so that the disk 12 will turn clockwise with the grip portion 8, until any desired film speed indication is brought to a visible position behind the windows 18 and 19. Thus in Fig. 4 the parts have been turned clockwise one notch or space from the position shown in Fig. 2, and it is seen that this clockwise turning has brought different film speed indications (carried by the disk 12) opposite the sight windows 18 and 19 of the stationary disk 20, but has not altered the film type indication 11 observed through the window 10. When the grip portion 8 turns counterclockwise, however, the spring 14 will simply click idly over the teeth 13 of the disk 14, while the spring 15 will engage the teeth 17 of the stationary ring 5 and thus will prevent the disk 12 from turning counterclockwise. The disk 12 will thus remain in the position to which it has previously been set, the film speed indication visible through the windows 18 and 19 will remain unchanged, but the grip or handle 8 together with the disks 4 and 9 will turn counterclockwise and hence will change the position of the window 10 (which is in the disk 9) until the desired one of the film type indications is brought opposite the window.

Thus it is seen that there is only one convenient and accessible operating member (namely the handle or grip portion 8) for setting both the film type and the film speed indications, rotation in a clockwise direction serving to set the film speed indications, after which the operator turns the handle counterclockwise to set the film type indications. All of this mechanism is built right into the hollow space in the interior of the focusing knob 2, in the preferred form of the invention, so takes up no extra room or extra space on the camera. Operation of the focusing knob 2 in the normal manner, when focusing the camera, does not affect the film type or film speed indications in any way.

Although it is preferred to build the indicating mechanism into the focusing knob, it is not necessarily in this location, for the indicating mechanism may be separately mounted on a wall of the camera, or placed in other convenient locations.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A selectively settable film type and speed indicator adapted to be mounted within a hollow focusing knob of a photographic camera, said indicator including a rotatable setting member having an observation window therein and also having an externally accessible handle part for turning it relative to said focusing knob, a plate fixed relative to said focusing knob and surrounding a portion of said setting member and having a second observation window therein, a disk rotatable relative to said focusing knob and lying partly behind said setting member and partly behind said plate, film type indications and film speed indications on said plate in position to be selectively settable behind and readable through said observation windows, and a pawl for transmitting rotary movement of said setting member in one direction only to said disk.

2. A construction as defined in claim 1, in which said pawl includes a leaf spring mounted on said disk and engaging ratchet teeth on said setting member.

3. A selectively settable film type and speed indicator adapted to be mounted within a hollow focusing knob of a photographic camera, said indicator including a rotatable setting member having an observation window therein and also having an externally accessible handle part for turning it relative to said focusing knob, a plate fixed relative to said focusing knob and surrounding a portion of said setting member and having a second observation window therein, a disk rotatable relative to said focusing knob and lying partly behind said setting member and partly behind said plate, film type indications and film speed indications on said plate in position to be selectively settable behind and readable through said observation windows, a first circumferential series of teeth on said setting member, a second circumferential series of teeth in fixed position within said focusing knob, and two pawls mounted on said disk, one engaging said first series of teeth to transmit turning movement of said setting member in one direction to said disk, the other pawl engaging said second series of teeth to prevent reverse movement of said disk when said setting member turns in a reverse direction.

4. A construction as defined in claim 3, in which said two pawls are formed as two arms of a double-armed leaf spring.

5. A selectively settable indicating mechanism adapted to be mounted on a camera body for indicating two separate values, said mechanism including a rotatable setting member, a stationary plate having an observation window, a rotatable disk lying at least partly behind said plate and having two series of separate values indicated thereon, one of said series being readable through said window, and a pawl and ratchet connection between said setting member and said disk for turning said disk from said setting member when said setting member turns in one direction without causing turning of said disk when said setting member turns in an opposite direction.

6. An indicator settable to indicate two independent series of photographic values, said indicator comprising a first member having an observation window therein, a second member mounted for rotation relative to said first member and also having an observation window therein, a third member mounted for rotation relative to both said first member and said second member and lying behind said first and second members, said third member having indications of a first series of values selectively settable to be read through said window in said first member and having indications of a second series of values selectively settable to be read through said window in said second member, means holding said third member against turning movement in one direction relative to said first member, and means coupling said third member to said second member to turn said third member from turning movement of said second member when said second member turns in another direction.

7. An indicator settable to indicate two independent series of photographic values, said indicator comprising a first member having an observation window therein, a second member mounted for rotation relative to said first member and also having an observation window therein, and a third member mounted for rotation relative to both said first member and said second member and lying behind said first and second members, said third member having indications of a first series of values selectively settable to be read through said window in said first member and having indications of a second series of values selectively settable to be read through said window in said second member.

8. An indicator settable to indicate two independent series of photographic values, said indicator comprising a first member having a first indicating means, a second member mounted adjacent to said first member and having a second indicating means, a third member mounted adjacent to both said first member and second member, said third member having a first series of values selectively settable to cooperate with said first indicating means on said first member and having a second series of values selectively settable to cooperate with said second indicating means on said second member, one of said members being fixed while the others of said members are rotatable relative thereto, means holding one of said rotatable members against turning movement as the other of said rotatable members is turned in one direction, and means coupling said rotatable elements for rotary movement as one of said rotatable elements is turned in another direction.

References Cited in the file of this patent
UNITED STATES PATENTS 2,350,733    Brotning _____ June 6, 1944